US006195938B1

(12) United States Patent
Kay

(10) Patent No.: US 6,195,938 B1
(45) Date of Patent: Mar. 6, 2001

(54) SEEDLING CONTAINER AND METHOD OF MAKING THE SAME

(75) Inventor: William Chee Kay, Edmonton (CA)

(73) Assignee: Alberta Research Council, Edmonton (CA)

(*) Notice: Subject to any disclaimer, the term of this patent is extended or adjusted under 35 U.S.C. 154(b) by 0 days.

(21) Appl. No.: 09/248,046

(22) Filed: Feb. 10, 1999

(30) Foreign Application Priority Data

Jan. 29, 1999 (CA) .................................................. 2260631

(51) Int. Cl.⁷ ........................................................ A01G 9/10
(52) U.S. Cl. .................................................. 47/77; 47/65.8
(58) Field of Search .................................... 47/65.5, 65.7, 47/65.8, 73, 74, 77, 78; 206/83.5; 229/87.05, 927

(56) References Cited

U.S. PATENT DOCUMENTS

| Re. 29,248 | * | 6/1977 | Congleton | ................................. 47/77 |
| 2,968,124 | * | 1/1961 | Coplan . | |
| 3,313,333 | * | 4/1967 | Lorid . | |
| 3,375,607 | * | 4/1968 | Melvold . | |
| 3,403,840 | * | 10/1968 | Mathes | ................................. 229/203 |
| 3,642,564 | * | 2/1972 | Walker et al. | ........................ 428/189 |
| 4,189,868 | * | 2/1980 | Tymchuck et al. | .................... 47/77 X |
| 4,245,431 | | 1/1981 | Barbulescu et al. | ..................... 47/1 A |
| 4,939,865 | * | 7/1990 | Whitcomb et al. | ....................... 47/77 |
| 6,088,962 | * | 7/2000 | Johnson | .................................... 47/73 |

FOREIGN PATENT DOCUMENTS

| 939905 | | 1/1974 | (CA) | ......................................... 47/20 |
| 0 172 060 | * | 2/1986 | (FR) | ....................................... 47/65.7 |

OTHER PUBLICATIONS

Abstract of U.S. Patent No. 4,008,544, Rupprecht, et al, issued Feb. 22, 1977.

* cited by examiner

Primary Examiner—Michael J. Carone
Assistant Examiner—Jeffrey L. Gellner
(74) Attorney, Agent, or Firm—Christensen O'Connor Johnson Kindness PLLC

(57) ABSTRACT

A seedling container and a method of making the same, that includes a sleeve filled with a compressed plant growth medium and having a first end, a second end, and a defining sidewall. The sidewall has at least one integrally formed tear away strip that extends between the first end and the second end. The tear away strip enables the sleeve to be readily removed to enable a seedling to be planted that is encased in plant growth medium.

10 Claims, 2 Drawing Sheets

SEEDLING CONTAINER AND METHOD OF MAKING THE SAME

FIELD OF THE INVENTION

The present invention relates to a seedling container and a method of making the same.

BACKGROUND OF THE INVENTION

Canadian Patent 939,905 describes a seedling container having a body of compressed peat moss encased in a thin, tubular, impermeable, flexible casing, which encases the side surface only of the body of compressed peat. U.S. Pat. No. 4,245,431 describes an apparatus for making seedling tubes, such as those described in Canadian Patent 939,905.

When it comes time to plant a seedling that has been grown in the seedling container, as described above, the thin tubular casing is removed. This is a time consuming process, that requires the use of a cutting instrument.

SUMMARY OF THE INVENTION

What is required is a seedling container that will make planting seedlings a less time consuming process.

According to one aspect of the present invention there is provided a seedling container that includes a sleeve filled with a compressed plant growth medium and having a first end, a second end, and a defining sidewall. The sidewall has at least one integrally formed tear away strip that extends between the first end and the second end.

When planting a seedling that has been grown in the seedling container, as described above; the sleeve is removed from around the plant growth medium by tearing away the tear away strip to open up the sidewall. This procedure can rapidly be performed and does not require any cutting tools. The seedling, still encased in plant growth medium, can then be planted.

Although beneficial results may be obtained through the use of the seedling container, as described above, even more beneficial results may be obtained when several tear away strips in the form of ribs are used. The tear away rib strips serve as reinforcement allowing a thinner sidewall to be used. The rib strips also serve to direct root growth downward when the roots reach an interface between the plant growth medium and the sleeve.

According to another aspect of the present invention there is provided a method of manufacturing a seedling container, involving the step of co-extruding an inner stream of compressed peat moss and an outer annular stream of polymer plastic. This forms a continuous flexible polymer plastic sleeve filled with compressed plant growth medium. The continuous coextruded sleeve with compressed plant growth medium is cut into individual lengths each having a first end, a second end and a defining sidewall with at least one integrally formed tear away strip that extends between the first end and the second end.

This method of manufacture allows the seedling container described above to be manufactured in a continuous process at a comparatively high rate of production.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
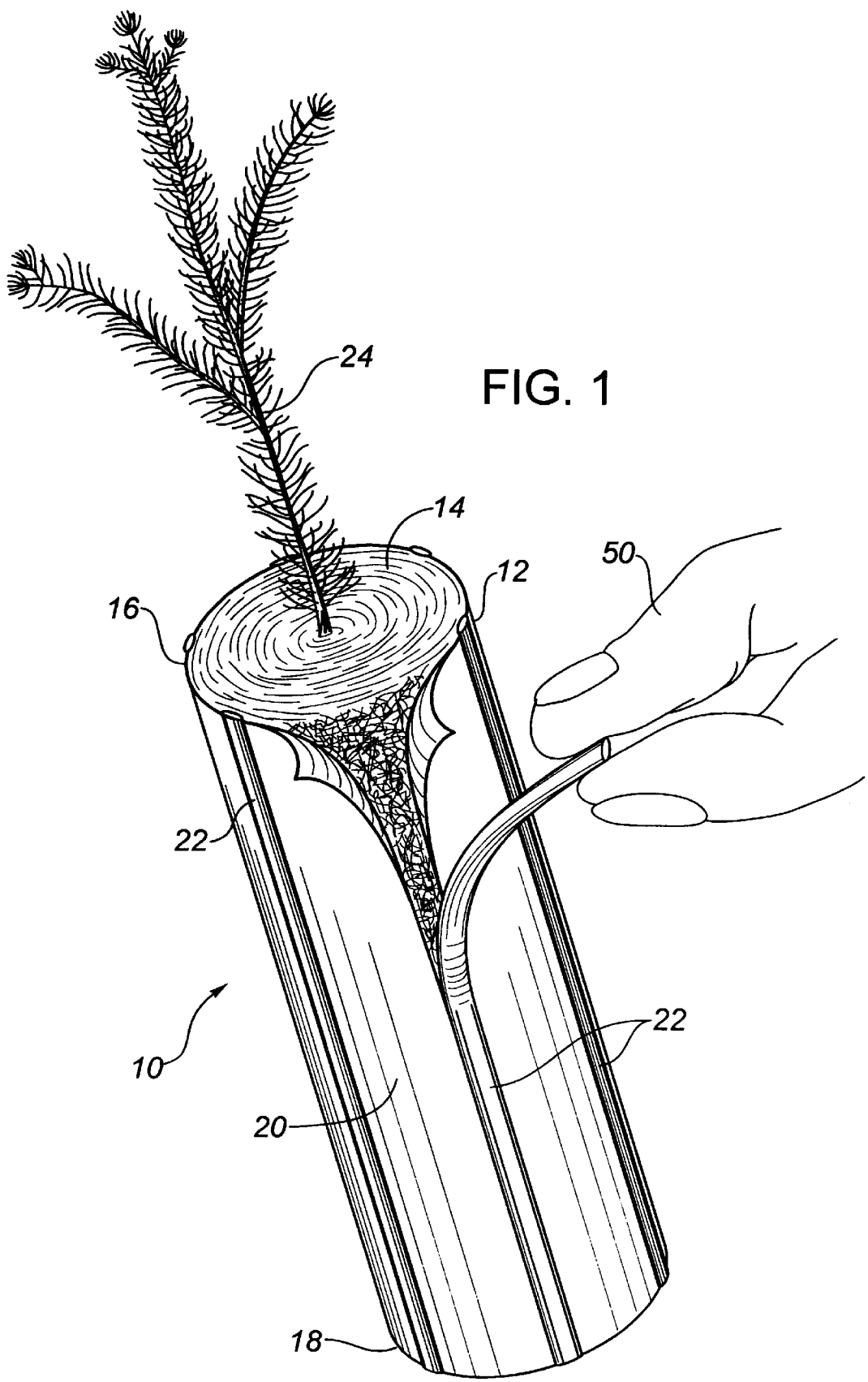
FIG. 1 is perspective view of a seedling container constructed in accordance with the teachings of the present invention.

The preferred embodiment, a seedling container generally identified by reference numeral 10, will now be described with reference to FIGS. 1 and 2.

Figure 2:
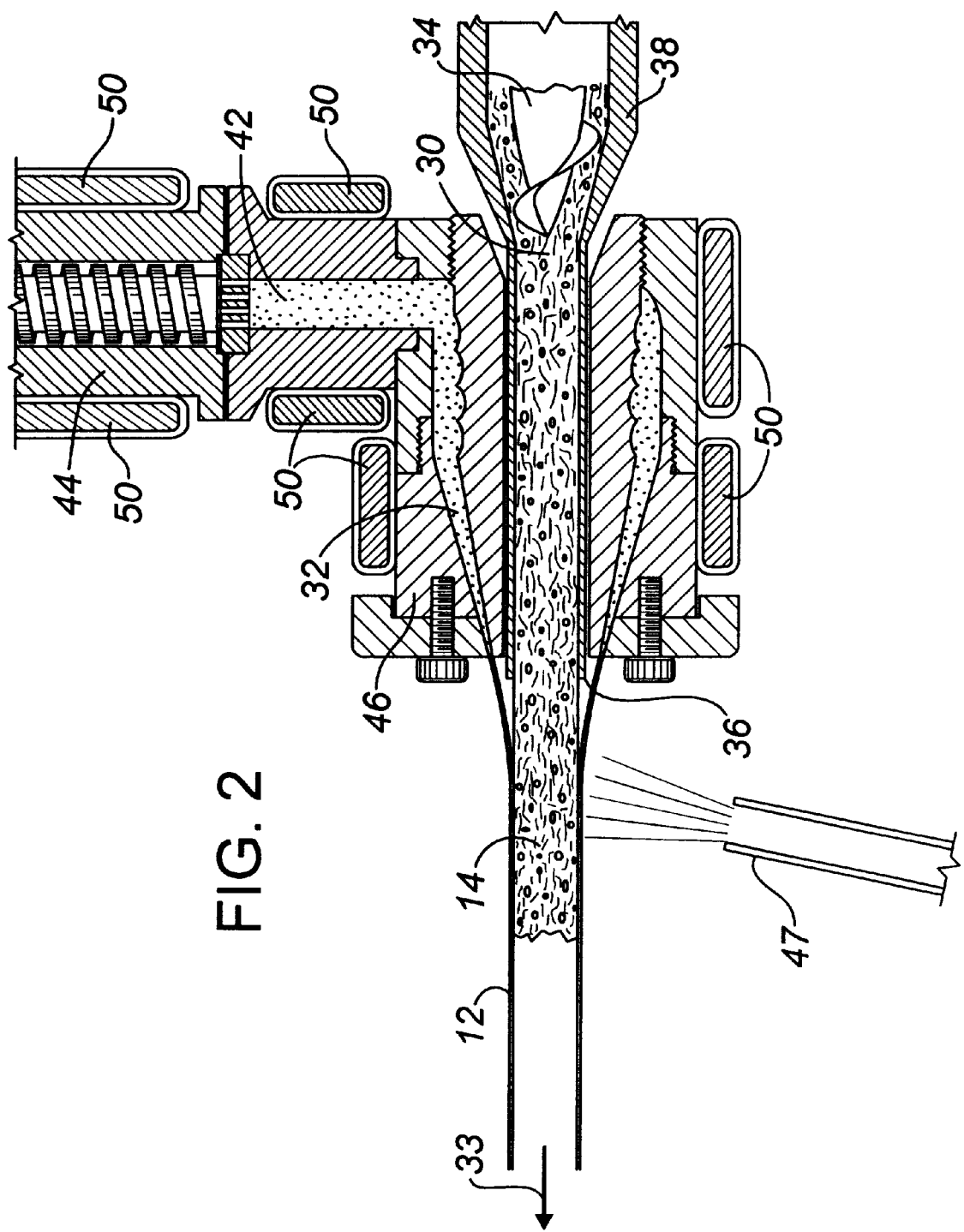
FIG. 2 is a side elevation view, in section, of a method of manufacturing a seedling container as illustrated in FIG. 1.

Referring to FIG. 2, in accordance with the teachings of the preferred method, seedling container 10 is manufactured by co-extruding an inner stream of plant growth medium, such as peat moss 30 and an outer annular stream of polymer plastic 32, thereby forming flexible polymer plastic sleeve 12 filled with compressed plant growth medium 14. Peat moss 30 is driven in a direction shown by arrow 33 by a screw drive 34 through a nozzle 36 of a peat extruder 38 to form a core of continuous length of compressed peat moss 30, with a substantially circular cross section. Molten thermoplastic, preferably polyethylene with low tear strength properties is extruded as outer annular stream of polymer plastic 32 from a plastics extruder 44 through a film forming die 46 in the same direction 33 as peat moss 30. There is a slight differential extrusion rate between the output of peat moss 30 and molten plastic 32. Peat moss 30 moves forward at a faster rate than molten plastic 32, so that molten plastic 32 is drawn down onto the surface of peat moss 30 which produces a plastic sleeve 12 about a compressed plant growth medium core 14. An air nozzle 47 cools and freezes the plastic sleeve 12 at the point at which it is drawn down to the diameter of the compressed peat moss core 14. Once plastic sleeve 12 is cooled, peat moss core 14 is held tightly within sleeve 12. It is important that the peat moss 30 used in the manufacture of seedling container 10 have adequate porosity and density to support plant growth. If the density is too high, the growth rate of seedlings grown in the resultant container will be adversely affected. There is a correlation between the level of moisture in the peat moss and its density. The density decreases as the moisture content increases. The moisture content is preferably within a range of 70% w/w to 84% w/w. Beneficial results have been obtained with a moisture content in a narrower higher end of that range of 78% w/w to 82% w/w. The peat moss must not be allowed to become too wet or too dry. If the moisture content rises above 84w/w % the peat moss no longer holds together. If the peat moss is dried to less than 40% of its original moisture content, its moisture holding capacity is degraded.

The continuous extrusion of peat moss 30 sheathed in polymer plastic 32 is cut into individual lengths to form seedling container 10 with a polymer plastic sleeve 12 filled with compressed plant growth medium 14 as illustrated in FIG. 1. Referring to FIG. 1, seedling container 10 has a flexible polymer plastic sleeve 12 filled with compressed plant growth medium 14, such as peat moss 30. Sleeve 12 has a first end 16, a second end 18 and a defining sidewall 20. Sidewall 20 has several integrally formed tear away rib strips 22 that extend between first end 16 and second end 18. Each seedling container 10, is turned on end and a depression is made in plant growth medium 14 at first end 16. A seed is placed in the depression and covered with sand to permit the seed to germinate and grow in seedling container 10. Tear away strips 22 are, preferably, in the form of ribs which serve to direct root growth downward when the roots reach an interface between plant growth medium 14 and sleeve 12. After an appropriate length of time, when the seed has germinated and the resultant seedling 24 has grown sufficiently robust, it is sent to the field to be planted. Just prior to planting the seedling, one of rib strips 22 is torn away to open up sidewall 20 of sleeve 12 permitting sleeve 12 to be removed and discarded. Seedling 24, still encased in plant growth medium 14, is then planted.

Seedling container 10 provides a number of significant advantages over the seedling container described in Canadian Patent 939,905. Seedling container 10 can be manufactured in a less labour intensive manner in a continuous manufacturing process at a higher production rate than was possible for the seedling container described in the 939,905 patent. The addition of the tear away strip 22 makes it easier to remove outer sleeve 12 without the necessity of using a knife or other sharp instrument. Tear away strips 22 are in the form of ribs, whereby root growth is directed downward when they reach an interface between plant growth medium 14 and sleeve 12. In the absence of ribs to direct root growth downward there is a danger that as the seedling will be strangled by its roots as it matures in sleeve 12.

It will be appreciated that although peat moss is used for illustration purposes, there are alternative plant growth mediums which may be used. For example, finely shredded bark or other natural fibrous materials may be used in place of peat moss if it does not degrade during the growing of the seedling. It will also be appreciated that other materials, such as pearlite or vermiculite, may be mixed with peat moss in order to increase porosity of the peat moss to accept more nutrient solutions at the root level. The addition of other material is permissible, as long as such additions do not interfere with the integrity of the plant growth medium when sleeve 12 is removed.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A seedling container, comprising:
    a sleeve filled with a compressed plant growth medium and having a first end, a second end, and a defining sidewall with several integrally formed ribs spaced along the defining sidewall and extending between the first end and the second end, whereby roots are directed downward when the roots reach an interface between the plant growth medium and the sidewall, at least one of the integrally formed ribs being a tear away rib strip such that by tearing away the rib strip the sidewall of the sleeve is opened to facilitate removal of the plant growth medium.

2. The seedling container as defined in claim 1, wherein each of the several integrally formed ribs spaced along the sidewall is a tear away rib strip.

3. The seedling container as defined in claim 1, wherein the sleeve is of a flexible polymer plastic.

4. The seedling container as defined in claim 3, wherein the flexible polymer plastic is polyethylene.

5. The seedling container as defined in claim 1, wherein the plant growth medium is peat moss with a moisture content sufficient to provide a density and a porosity that will support plant growth.

6. The seedling container as defined in claim 5, wherein the peat moss has a moisture content of between 70% w/w and 84% w/w.

7. The seedling container as defined in claim 6, wherein the peat moss has a moisture content of between 78% w/w and 82% w/w.

8. The seedling container as defined in claim 5, wherein other plant growth materials are added to the peat moss to increase the porosity of the peat moss.

9. The seedling container as defined in claim 8, wherein the other plant growth materials include at least one of pearlite and vermiculite.

10. A seedling container, comprising:
    a flexible polymer plastic sleeve filled with compressed peat moss having a moisture content of between 70% w/w and 84% w/w, the sleeve having a first end, a second end and a defining sidewall with several integrally formed tear away rib strips that extend between the first end and the second end, such that by tearing away one of the rib strips the sidewall of the sleeve is opened to facilitate removal of the plant growth medium, the several integrally formed ribs being spaced along the defining sidewall, whereby roots are directed downward when the roots reach an interface between the plant growth medium and the sidewall.

\* \* \* \* \*